(12) United States Patent
Kuhwald

(10) Patent No.: US 7,039,471 B2
(45) Date of Patent: May 2, 2006

(54) METHOD AND DEVICE FOR CALCULATING THE STEADY-STATE TIME POINT OF A CONTROLLER

(75) Inventor: Thomas Kuhwald, Dietramszell (DE)

(73) Assignee: Rohde & Schwarz, GmbH & Co. KG, Munich (DE)

( * ) Notice: Subject to any disclaimer, the term of this patent is extended or adjusted under 35 U.S.C. 154(b) by 305 days.

(21) Appl. No.: 10/456,523

(22) Filed: Jun. 9, 2003

(65) Prior Publication Data

US 2004/0006400 A1    Jan. 8, 2004

(30) Foreign Application Priority Data

Jul. 3, 2002    (DE) ................. 102 29 905

(51) Int. Cl.
*G05B 15/00* (2006.01)

(52) U.S. Cl. ............... 700/1; 700/21; 700/38; 700/71; 700/72; 700/78; 700/81; 702/66; 702/69; 702/117; 702/189; 702/190; 702/79; 702/176; 324/76.12; 324/102; 324/618; 368/89; 368/107

(58) Field of Classification Search ........... 700/1, 700/21, 38, 71, 72, 78, 81; 324/76.12, 102, 324/618; 702/66, 69, 117, 189, 190, 79, 702/176; 368/89, 107
See application file for complete search history.

(56) References Cited

U.S. PATENT DOCUMENTS

| | | | |
|---|---|---|---|
| 4,527,907 A | * | 7/1985 | Chan ............... 368/118 |
| 4,604,681 A |   | 8/1986 | Sakashita |
| 5,162,744 A | * | 11/1992 | Koozer ............... 324/618 |
| 6,680,607 B1 | * | 1/2004 | Smith ............... 324/76.79 |

OTHER PUBLICATIONS

Follinger Otto, Regelungstechnik, Huthig Buch Verlag Heidelberg, ISBN: 3-7785-2336-8, 1994, pp. 226-234, chap. 7.2, vol. 8, Germany.

Schmidt G., Grundlagen der Regelungstechnik, Analyse und Entwurf linearer und einfacher michtlinearer Regelungen sowie diskreter Steuerungen, ISBN 3-540-17112-6 (Berlin Heidelberg New York) 1989, pp. 98-99, 107-109, Germany.

* cited by examiner

*Primary Examiner*—Anthony Knight
*Assistant Examiner*—Douglas Shute
(74) *Attorney, Agent, or Firm*—Ditthavong & Carlson, P.C.

(57) ABSTRACT

A device for calculating the steady state behavior of a controller includes an amount generating unit for generating the amount of deviation of the regulator, a first threshold value calculation unit that detects whether the amount of deviation of the regulator has fallen below a first threshold value and then starts a lag time delay unit, and a second threshold value calculation unit that detects whether the amount of deviation of the regulator has fallen below a second threshold value. A signal transmission unit transmits a ready message signal when the lag time delay unit has reached a predetermined lag time and the second threshold value calculation unit has detected that the amount of deviation of the regulator has fallen below the second threshold value.

14 Claims, 2 Drawing Sheets

METHOD AND DEVICE FOR CALCULATING THE STEADY-STATE TIME POINT OF A CONTROLLER

The present application claims priority to German Patent Application No. 102 29 905.6 dated Jul. 3, 2002, entitled "Verfahren und Vorrichtung zum Erfassen des Einschwingzeitpunkts eines Reglers."

FIELD OF THE INVENTION

The present invention relates to controllers and more particularly to a method and device for calculating the steady-state time point of a controller.

BACKGROUND OF THE INVENTION

A general problem in controllers and controller circuits is the calculation of the steady state time, i.e., the point in time at which the control variable has approached the command variable with sufficient precision. The difference between the command variable and the control variable will be referred to in the following as deviation and the absolute value of the deviation will be referred to as the amount of deviation. The difficulty of calculating the steady state behavior of the controller is present in all controllers in which the deviation decays during the steady state sequence, either due to an oscillation sequence or aperiodically, for example, in a PT (proportional with time constant) controller, in particular a PT controller with a degree greater than one, for example, a $PT_2$ controller in which an insulated oscillation sequence occurs during the steady state phase, but also, for example, in a PDT (proportional and differentiating with time constant) or PIT (proportional and integrating with time constant) controller. The classification of controllers cited above may be found by way of example in G. Schmidt, "Grundlagen der Regelungstechnik" [Fundamentals of Control Engineering], $2^{nd}$ edition, ISBN 3-540-17112-6, 1989, Table 2.6 on pages 98 and 99.

All controllers that are subjected to an oscillation sequence present the problem that the regulation is not yet fully functional as long as the controller is not yet in a steady state. Solutions to this problem exist in which a sequence that is dependent upon the controller may not be released until the controller is in a steady state. For example, an electronic measuring device has an automatic regulation of the level intensification of the input signal (ALC, automatic level control). This automatic control of the level intensification produces a controller circuit that is subjected to an oscillation sequence. The measuring procedure, for example, a signal vector analysis, may not be initiated until the oscillation sequence is completed. On the other hand, the lag time before the initiation of the measurement should be kept as short as possible in order to reduce the total measuring time of the measuring device and to prevent unnecessary lag time.

In chapter 2.9.6.4 on pages 107 and 108 of the abovementioned book by G. Schmidt, "Grundlagen der Regelungstechnik," the recommendation is made, in the case of a $PT_2$ controller whose transmission function displays a dampened oscillation during the steady state phase, for the steady state time to be defined such that the envelope of the transmission function has decayed to 5% of the steady-state value (asymptotic limiting value of the transmission function). However, no definitive information regarding the steady state time can be acquired from the definition that the steady state sequence is defined as having ended when the envelope of the transmission function and/or the deviation has decayed to 5% because the steady state time depends on the initiation conditions. The abovementioned book therefore has only a crudely estimated description of steady state time for a $PT_2$ controller as a function of the angular frequency and the damping constant. For many applications, however, this estimate is not sufficiently precise. For example, in the application mentioned at the outset of the automatic level regulation in the framework of a series of measurements for vector analysis, several input signals with different levels are measured and an unnecessary lag time for the steady state of the level of every input signal to be measured would severely increase the measurement time.

There exists therefore a need to provide a method and device for calculating the steady state time of a controller with which the steady state time may be calculated with a high degree of precision.

SUMMARY OF THE INVENTION

These and other needs are addressed by the present invention, in which the amount of deviation of the controller is compared to two threshold values. When the amount of deviation falls below a first threshold value for the last time, a lag time is initiated. After the lag time has expired, the process is delayed for a sufficient time until the amount of deviation falls below the second threshold value for the first time. The lag time that must pass after the amount of deviation has fallen below the first threshold value for the last time can be derived from the envelope of the amount of deviation and optimized in such a way that the amount of deviation after this lag time falls below the second threshold value only once more, but does not exceed it again. This optimization can be performed for all initial values of the oscillation sequence of the deviation.

The optimized lag time can be calculated using the time constants of the steady state sequence and the logarithmic ratio of the two threshold values.

It is advantageous if, for the purpose of monitoring stability after the deviation has fallen below the second threshold value, i.e., after the completion message of the steady state sequence, the precaution is taken of monitoring whether the amount of deviation does not again fall below a third threshold value that is greater than the second threshold value. In this case, an appropriate error signal can be transmitted.

The lag time delay can be performed using a counter that is started when the amount of deviation falls below the first threshold value. If the amount of deviation exceeds this first threshold value again, the counter can be stopped and reset and restarted the next time the amount of deviation falls below the first threshold value. The counter cycle then marks the end of the lag time. Using a logical AND connection of the counter cycle to the amount of deviation falling below the first threshold value, the completion signal is then set, which may be kept constantly on the output by a flip-flop, for example.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and device for calculating the steady-state time point of a controller are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
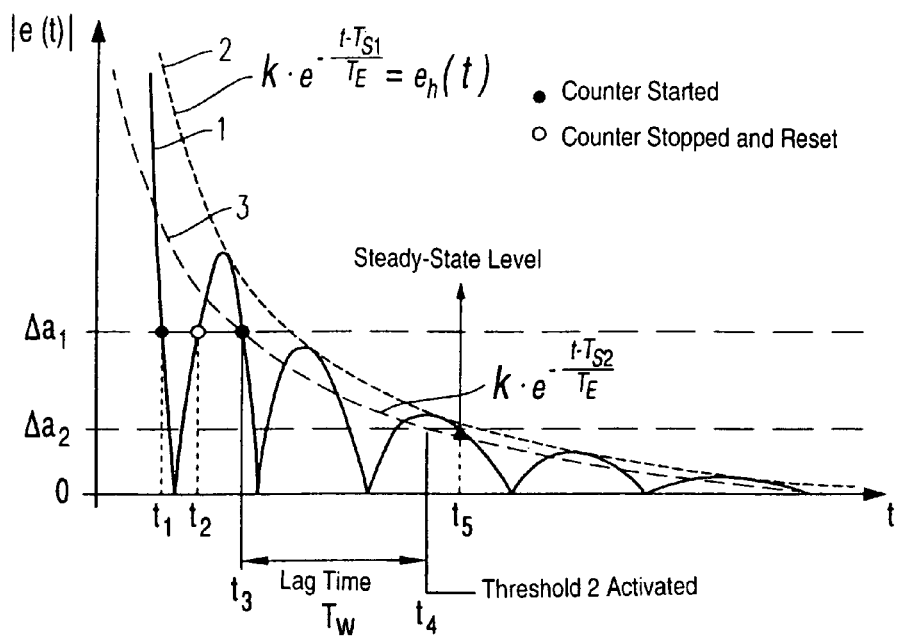
FIG. 1 shows the amount of deviation |e(t)| as a function of time to illustrate the steady state monitoring according to the invention.

FIG. 1 shows the amount of deviation |e(t)| as a function of time t. In the following, "deviation" will be understood to mean the deviation of the control variable from the command variable. For example, a $PT_2$ controller (second class proportional controller with time constant) displays a progression of the absolute value of the deviation |e(t)| over time, as is shown in FIG. 1. While the amount of deviation |e(t)| is provided with the reference number 1 in FIG. 1, the envelope $e_h(t)$, which is also shown, is provided with the reference number 2.

One embodiment of the present invention works with a first threshold value $\Delta a_1$ and a second threshold value $\Delta a_2$. The envelope $e_h(t)$ of the steady state sequence is described using the function $$e_h(t) = k \cdot e^{-\frac{t-T_{S1}}{T_E}} \quad (1)$$

where the constant k indicates the deviation to be compensated by the controller, $T_E$ indicates the starting time of the steady state sequence, and the constant $T_{S1}$ indicates the starting time of the steady state sequence. It can be shown that transmission function of the envelope has the following form:

$$G_w(s) = \frac{1}{1+s \cdot T_E} \quad (2)$$

One embodiment of the present invention initially lies in determining when the amount of deviation |e(t)| falls below the first threshold value $\Delta a_1$ for the last time. In the example shown in FIG. 1, the deviation falls below the first threshold value $\Delta a_1$ at the time point $t_1$. At the time point $t_2$, however, the deviation falls below the first threshold value $\Delta a_1$ again, and again at the time point $t_3$, this time for the last time. At the time point at which the deviation falls below the first threshold value $\Delta a_1$ for the last time, i.e., at time point $t_3$, a lag time $T_W$ is started that ends at time point $t_4$ in the example shown in FIG. 1. After this lag time $T_W$ has expired, the controller, using the concept according to the invention, verifies whether the deviation has fallen below a second threshold value $\Delta a_2$, which as a rule is less than the first threshold value $\Delta a_1$, for the first time. In the example shown in FIG. 1, after the lag time $T_W$ has expired, the deviation falls below the second threshold value $\Delta a_2$ for the first time at time point $t_5$. Beginning at the point at which the deviation falls under the second threshold value $\Delta a_2$ for the first time after the lag time $T_W$ has expired, the decision is made that the controller has entered steady state.

Here, the lag time $T_W$ can be structured in such a way that, after the lag time $T_W$ has expired, i.e., at time point $t_4$ in the example shown in FIG. 1, the deviation does still exceed the second threshold value $\Delta a_2$, but after the next time it falls below the second threshold value, at time point $t_5$ in the example shown in FIG. 1, the subsequent maximum will not exceed the second threshold value again. Expressed differently, after the lag time $T_W$ has expired, the time point $t_4$ should be located in the range of the maximum of the amount of deviation |e(t)| that exceeds the second threshold value $\Delta a_2$ for the first time. In so doing, it is important for this condition to be fulfilled for all of the starting conditions of the steady state sequence. The curve 1 shown in FIG. 1 is displaced differently along the time axis t for different starting conditions, which are characterized by different starting time points $T_S$ of the steady state sequence, and thus may not be reproduced from steady state sequence to steady state sequence.

In order to ensure the above condition at time point $t_4$, the lag time $T_W$ is preferably structured in such a way that, at time point $t_4$ at the end of the lag time $T_W$, the second threshold value $\Delta a_2$ lies on the same curve 3 on which the threshold value $\Delta a_1$ lies at time point $t_3$. Here, the curve 3 corresponds to the temporal progression of the envelope $e_h(t)$, which is shown in FIG. 1 by the curve 2, although with a different starting time point $T_{S2}$, which is selected to be smaller than the starting time point $T_{S1}$ of the envelope $e_h(t)$.

The structure of the lag time $T_W$ for steady state control therefore results as follows: if the first threshold $\Delta a_1$ is attained at the time point $$t_3 = T_E \cdot ln(k/\Delta a_1) \quad (3)$$

then, according to equation (1), the threshold value $\Delta a_2$ will be attained at time point $$t_4 = T_E \cdot ln(k/\Delta a_2) \quad (4)$$

The lag time between attaining the threshold values then results as $$T_W = t_4 - t_3 = T_E \cdot ln\frac{\Delta a_1}{\Delta a_2} \quad (5)$$

As a result, the lag time $T_W$ must always be provided dependent upon the required tolerance range as well as dependent upon the distance of the threshold values. In the case of a PI controller with a fixed distance of 0.5 dB between the threshold values and an integration time of $T_i=0.55$ µs, the lag times $T_W$ according to the following table result:

| Precision in dB | Lag Time Tw |
|---|---|
| 0.1 | 2.8 µs |
| 0.5 | 1.1 µs |
| 1.0 | 0.6 µs |

Figure 2:
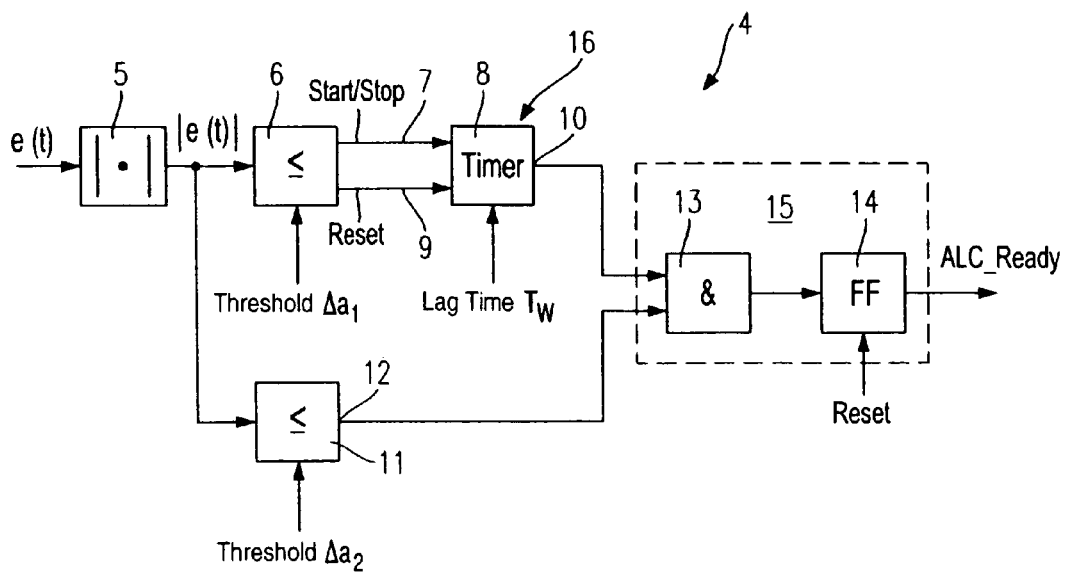
FIG. 2 is a block diagram to illustrate the steady state monitoring according to the invention.

FIG. 2 shows a block diagram of a device for performing the method according to the invention described with reference to FIG. 1.

The amount $|e(t)|$ of deviation $e(t)$ is generated in an amount generating unit 5. A first threshold value calculation unit 6, for example, a comparator, detects whether the amount $|e(t)|$ falls below the first threshold value $\Delta a_1$. If this is the case, a lag time delay unit 16 is started by way of a start/stop line 7; the lag time delay unit is shown as a counter 8 in the exemplary embodiment. In the example shown in FIG. 1, this is the case for the first time at time point $t_1$. However, if the first threshold value $\Delta a_1$ is subsequently exceeded again, the counter 8 is stopped by way of the start/stop line 7 and reset by way of the reset line 9. In the example shown in FIG. 1, this occurs at time point $t_2$. At time point $t_3$, the amount of deviation $|e(t)|$ again falls below the first threshold value $\Delta a_1$ and the counter 8 is started again. The starting and stopping of the counter 8 is also shown in FIG. 1.

If the counter 8 reaches its counting target, its output 10 receives a certain logical state, for example, a logical "1." For instance, a counting target is provided to the counter 8 that corresponds to the given lag time $T_W$ when multiplied by the cycle period of the system cycle. The counter 8 is decremented after each cycle period of the system cycle. If the counter state becomes zero, the output 10 of the counter 8 indicates this with a logical "1."

At the same time, in a second threshold value calculation unit 11, for example, a comparator, the amount of deviation $|e(t)|$ is compared to the second threshold value $\Delta a_2$. Each time the amount of deviation $|e(t)|$ falls below the second threshold value $\Delta a_2$, the output 12 of the second threshold value calculation unit 11 receives a certain logical state, for example, a logical "1."

A first signal transmission unit 15 includes an AND gate 13 and a flip-flop 14. The output 10 of the counter 8 as well as the output 12 of the second threshold value calculation unit 11 are connected to a logical AND gate 13. If the counter 8 has reached its counting target, i.e., the lag time $T_W$ has expired, and the amount of deviation $|e(t)|$ has also fallen below the second threshold value $\Delta a_2$, i.e., the first time the amount of deviation has fallen below the second threshold value $\Delta a_2$ after the lag time $T_W$ has expired, the output of the AND gate 13 receives a logical "1" with which it sets a flip-flop 14. The flip-flop 14 thus produces a ready message signal ALC_Ready.

An advantageous development of an embodiment of the invention will be explained in the following with reference to FIGS. 3 and 4.

FIG. 3 again shows the amount of deviation $|e(t)|$ as a function of time t. As explained above, the decision is made at time point $t_5$ that the controller has entered steady state and the ready message signal ALC_Ready is produced.

However, situations may occur in which the controller does not remain stable in subsequent operation. In the example of an automatic level controller at the input of a measuring device mentioned at the outset, this can lead to a falsification of the measurement results. Such level errors must therefore be detected and reported to the process control.

Figure 3:
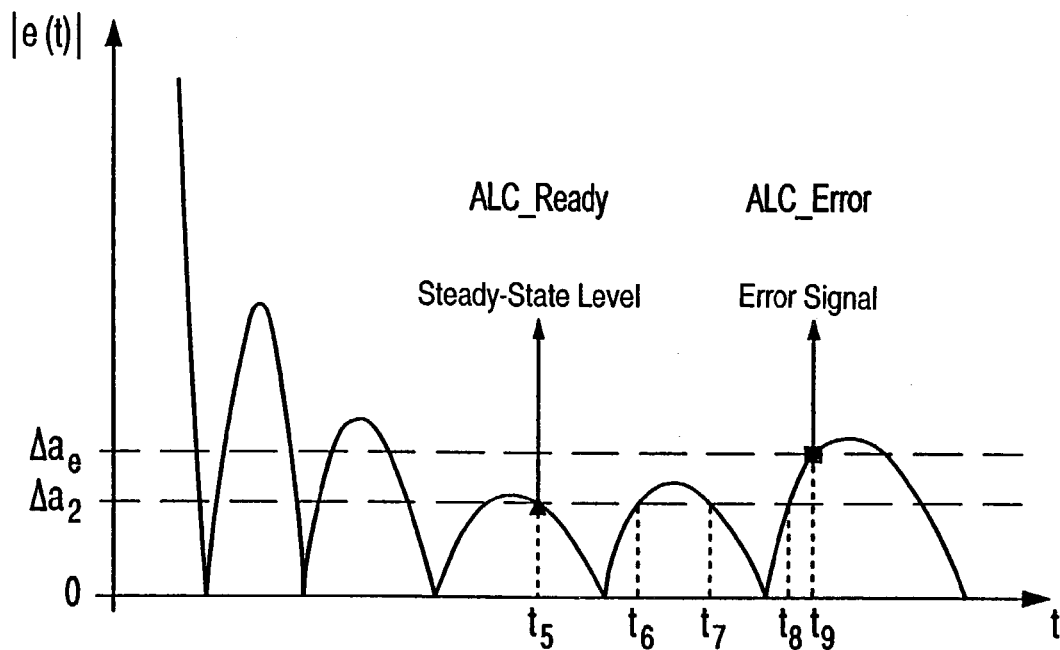
FIG. 3 shows the amount of deviation |e(t)| as a function of time t to illustrate the stability control corresponding to an advantageous development according to the invention.

According to the advantageous development, the amount of deviation $|e(t)|$ is therefore continuously compared to a third threshold value $\Delta a_e$ after the detection of the steady state time point, i.e., after time point $t_5$ in the example according to FIG. 3. In the example shown in FIG. 3, the amount of deviation $|e(t)|$ reaches this third threshold value $\Delta a_e$, which is generally greater than the second threshold value $\Delta a_2$, for the first time at time point $t_9$. For the early detection of any instability, it is advantageous for the third threshold value $\Delta a_e$ to be only slightly greater than the second threshold value $\Delta a_2$ and therefore considerably less than the first threshold value $\Delta a_1$.

Figure 4:
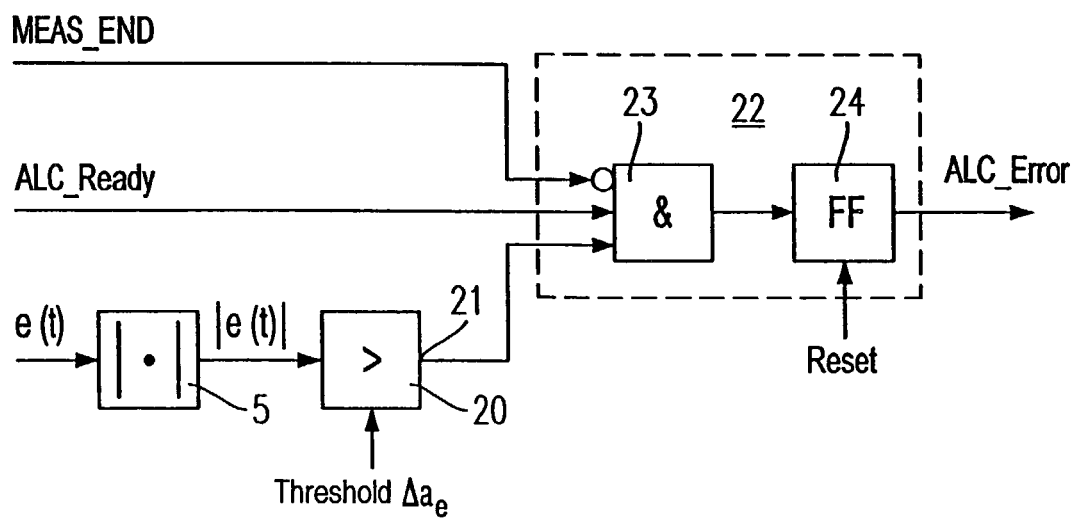
FIG. 4 is a block diagram to illustrate the stability monitoring.

FIG. 4 shows a block diagram for implementing the development described with reference to FIG. 3.

In the amount generating unit 5, the amount $|e(t)|$ of deviation $e(t)$ is calculated and transmitted to a third threshold value calculation unit 20. If the amount of deviation $|e(t)|$ exceeds the third threshold value $\Delta a_e$, the output 21 of the third threshold value calculation unit 20 assumes a certain logical state, for example, the logical state "1." The output 21 of the third threshold value calculation unit 20 and the ready message signal ALC_Ready produced by the first signal transmission unit 15 are connected to a second signal transmission unit 22 that transmits an error signal ALC_Error if the first signal transmission unit 15 has already produced the ready message signal ALC_Ready and the third threshold value calculation unit 20 has detected that the amount of deviation $|e(t)|$ of the controller has again exceeded the third threshold value $\Delta a_e$.

Additionally, in the example shown, the second signal transmission unit 22 includes an AND gate 23, which is connected to the output 21 of the third threshold value calculation unit 20 and to which the ready message signal ALC_Ready is sent. Moreover, in the exemplary embodiment shown in FIG. 4, the reversed signal MEAS_END, which indicates the end of the measurement, is sent to the AND gate 23. The AND gate 23 therefore only has the logical state "1" at its end when the ready message signal ALC_Ready has already been sent and the third threshold value $\Delta a_e$ has been exceeded again and the measurement has not yet ended. After the measurement has ended, instabilities of the control device, e.g., for the automatic level control of the input signal, are naturally no longer of interest.

The output of the AND gate 23 is connected to a second flip-flop 24. Beginning at the time point at which the AND gate 23 assumes the logical state "1" for the first time, the error signal ALC_Error is produced at the output of the flip-flop 24, which remains set until the next reset impulse "Reset."

While the present invention has been described in connection with a number of embodiments and implementations, the present invention is not so limited but covers various obvious modifications and equivalent arrangements, which fall within the purview of the appended claims. For example, the invention is not limited to the exemplary embodiment shown and can be used in a large number of controllers, such as PT, PI, or PD controllers. The exemplary embodiment of an automatic level controller (ALC) that was used is to be understood as having been used only by way of example. Naturally, the invention can be used in controllers with different control functions.

What is claimed is:

1. A method for calculating the time point at which a controller enters steady state, comprising:
   detecting whether an amount of deviation of the controller falls below a first threshold value;
   starting a lag time when the amount of deviation of the controller falls below the first threshold value for the latest time;
   after the lag time has expired, detecting whether the amount of deviation of the controller falls below a second threshold value; and
   determining that the controller has entered steady state when, after the lag time has expired, the amount of deviation of the controller has fallen below the second threshold value for the first time.

2. The method according to claim 1, wherein the lag time is restarted every time the amount of deviation of the controller falls below the first threshold value again after having exceeded the first threshold value.

3. The method according to claim 1, wherein the second threshold value is less than the first threshold value, and the first threshold value, the second threshold value, and the lag time are adapted to one another to correspond with the decay behavior of the envelope $e_h(t)$ of the amount of deviation of the controller.

4. The method according to claim 3, wherein the envelope $e_h(t)$ of the amount of deviation of the controller is described by the function $$e_h(t) = k \cdot e^{-\frac{t-T_{S1}}{T_E}}$$

where
k is any given constant,
$T_E$ is the time constants of the steady state sequence, and
$T_{S1}$ is the starting time point of the steady state sequence.

5. The method according to claim 4, wherein the following relationship exists between the lag time $T_W$, the time constants $T_E$ of the steady state sequence, the first threshold value $\Delta a_1$, and the second threshold value $\Delta a_2$ $$T_W = T_E \cdot ln(\Delta a_1/\Delta a_2)$$

where ln is the natural logarithm.

6. The method according to claim 1, wherein a ready message signal is transmitted when the decision is made that the controller has entered steady state.

7. The method according to claim 1, wherein, after the amount of deviation has fallen below the second threshold value, the amount of deviation of the controller is monitored for whether it exceeds a third threshold value, which is greater than the second threshold value.

8. The method according to claim 7, wherein an error signal is transmitted if the amount of deviation of the controller exceeds the third threshold value.

9. A device for calculating the steady state time of a controller, comprising:
   an amount generating unit configured for generating an amount of deviation of the controller;
   a first threshold value calculation unit configured for calculating whether the amount of deviation of the controller has fallen below a first threshold value and starting a lag time delay unit when the deviation value is below the first threshold value;
   a second threshold value calculation unit configured for calculating whether the amount of deviation of the controller has fallen below a second threshold value; and
   a first signal transmission unit configured for transmitting a ready message signal when the lag time delay unit has attained a predetermined lag time and the second threshold value calculation unit has detected that the amount of deviation of the controller has fallen below the second threshold value.

10. The device according to claim 9, wherein the lag time delay unit includes a counter, and the first threshold value calculation unit is further configured for starting the counter when the amount of deviation of the controller has fallen below a first threshold value.

11. The device according to claim 10, wherein the first threshold value calculation unit is further configured for stopping and resetting the counter if the amount of deviation of the controller exceeds the first threshold value again.

12. The device according to claim 11, wherein the first threshold value calculation unit restarts the counter if the amount of deviation of the controller falls below the first threshold value again.

13. The device according to claim 9, wherein the first signal transmission unit includes a first AND gate and a first flip-flop; the first AND gate configured for setting the first flip-flop when the counter has attained a counting target and the second threshold value calculation device has detected that the amount of deviation of the controller has fallen below the second threshold value.

14. The device according to claim 9, further comprising:
   a third threshold value calculation unit configured for detecting whether the amount of deviation of the controller has fallen below a third threshold value; and
   a second signal transmission unit configured for transmitting an error signal if the first signal transmission unit has already transmitted the ready message signal and the third threshold calculation unit has detected that the amount of deviation of the controller has exceeded the third threshold value.

* * * * *